(12) United States Patent  
Kochar et al.

(10) Patent No.: US 12,001,350 B2  
(45) Date of Patent: Jun. 4, 2024

(54) DYNAMICALLY CONFIGURABLE MOTHERBOARD

(71) Applicant: Oracle International Corporation, Redwood Shores, CA (US)

(72) Inventors: Sumeet Kochar, Cary, NC (US); Buddy Duane Lumpkin, Puyallup, WA (US)

(73) Assignee: Oracle International Corporation, Redwood Shores, CA (US)

(*) Notice: Subject to any disclaimer, the term of this patent is extended or adjusted under 35 U.S.C. 154(b) by 57 days.

(21) Appl. No.: 17/961,902

(22) Filed: Oct. 7, 2022

(65) Prior Publication Data

US 2024/0119011 A1   Apr. 11, 2024

(51) Int. Cl.
  *G06F 13/12* (2006.01)
  *G06F 13/40* (2006.01)

(52) U.S. Cl.
  CPC ........ *G06F 13/126* (2013.01); *G06F 13/4068* (2013.01)

(58) Field of Classification Search
  None
  See application file for complete search history.

(56) References Cited

U.S. PATENT DOCUMENTS

2016/0246754 A1* 8/2016 Rao .................... G06F 13/4068

OTHER PUBLICATIONS

Dixit, et al., "Silent Data Corruptions at Scale," Meta Research, Feb. 22, 2021, 4 pages.
"Amazon re:Invents The Data Center," Amazon.com, Inc., Dec. 20, 2021, 10 pages.
"What is Partitioning?" Oracle Partitioning Policy, 2014, 5 pages.

* cited by examiner

*Primary Examiner* — Scott C Sun
(74) *Attorney, Agent, or Firm* — Kilpatrick Townsend & Stockton LLP

(57) ABSTRACT

According to certain implementations, a motherboard is provided that enables operation as either multiple independent single-processor systems or a single multiple-processor system. In response to a request to configure the motherboard as multiple independent single-processor systems, a control block is implemented for each processor attached to the motherboard, where the control blocks configure the processors to boot and operate independently of each other, and the processors utilize separate motherboard resources. In response to a request to configure the motherboard as multiple independent single-processor systems, a single control block is implemented all processors attached to the motherboard, where the single control block configures all processors to boot and operate in a connected state, and the processors share all motherboard resources.

20 Claims, 12 Drawing Sheets

DYNAMICALLY CONFIGURABLE MOTHERBOARD

BACKGROUND

Hardware servers are critical to the implementation of computing environments such as cloud computing environments and multi-tenant systems. For example, tenants of a multi-tenant system may require a bare metal server (e.g., a single computer server to be used by the single tenant) for use in performing compute and storage operations for the tenant.

The way in which the hardware of a server is configured can have a significant effect on the performance of the server while processing particular workloads. For example, some workloads may benefit from a server having a motherboard with a single processor that avoids cross-socket NUMA latencies, while other workloads may benefit from a server having a motherboard with a multiple-processor configuration. However, current motherboards are only able to be pre-set with a single configuration (either a multiple independent single-processor system configuration or a single multiple-processor system configuration) at a time of manufacture of the motherboard.

BRIEF SUMMARY

The present disclosure relates generally to motherboard design and implementation. More particularly, novel techniques are described for implementing a dynamically configurable motherboard that can operate in either a multiple independent single-processor system configuration or a single multiple-processor system configuration. Various embodiments are described herein to illustrate various features. These embodiments include various methods, systems, non-transitory computer-readable storage media storing programs, code, or instructions executable by one or more processors, and the like.

According to certain implementations, a motherboard is provided that enables operation as either multiple independent single-processor systems or a single multiple-processor system. In response to a request to configure the motherboard as multiple independent single-processor systems, a control block is implemented for each processor attached to the motherboard, where the control blocks configure the processors to boot and operate independently of each other, and the processors utilize separate motherboard resources. In response to a request to configure the motherboard as multiple independent single-processor systems, a single control block is implemented all processors attached to the motherboard, where the single control block configures all processors to boot and operate in a connected state, and the processors share all motherboard resources.

At least one embodiment is directed to a motherboard hardware-implemented method. The method can include responsive to a signal to configure the motherboard as multiple independent single-processor systems, configuring, by the motherboard hardware, one or more components within the motherboard to enable an operation of the motherboard as the multiple independent single-processor systems; and responsive to a signal to configure the motherboard as a single multiple-processor system, configuring, by the motherboard hardware, one or more components within the motherboard to enable an operation of the motherboard as the single multiple-processor system.

Another embodiment is directed to a motherboard comprising hardware configured to perform any suitable combination of the method(s) disclosed herein.

Still another embodiment is directed to motherboard hardware storing a set of instructions, that, when executed by the motherboard hardware, cause the motherboard hardware to perform any suitable combination of the method(s) disclosed herein.

The foregoing, together with other features and embodiments will become more apparent upon referring to the following specification, claims, and accompanying drawings.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

In the following description, for the purposes of explanation, specific details are set forth in order to provide a thorough understanding of certain embodiments. However, it will be apparent that various embodiments may be practiced without these specific details. The FIGS. and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Currently, motherboards of servers (such as bare-metal servers implemented within multi-tenant systems) need to be pre-configured during production to either operate in a multiple independent single-processor system configuration or a single multiple-processor system configuration. Therefore, if a tenant of a multi-tenant system wants to switch from a multiple independent single-processor system to a single multiple-processor system configuration, the tenant must move their data from a first bare-metal server (configured to operate in a multiple independent single-processor system configuration) to a second bare-metal server (configured to operate in a single multiple-processor system configuration).

To address this issue, a motherboard of a server is provided that can operate in either a multiple independent single-processor system configuration or a single multiple-processor system configuration. In response to receiving a signal indicating a multiple independent single-processor system configuration, the motherboard implements separate control blocks to configure each processor attached to the motherboard, where the control blocks configure the processors to boot and operate independently of each other, and the processors each utilize separate motherboard resources assigned to the specific processor. In response to receiving a signal indicating a single multiple-processor system configuration, the motherboard implements a single control block to configure all processors attached to the motherboard, where the control block configures all processors to boot and operate in a connected state, and the processors share all motherboard resources.

Figure 1:
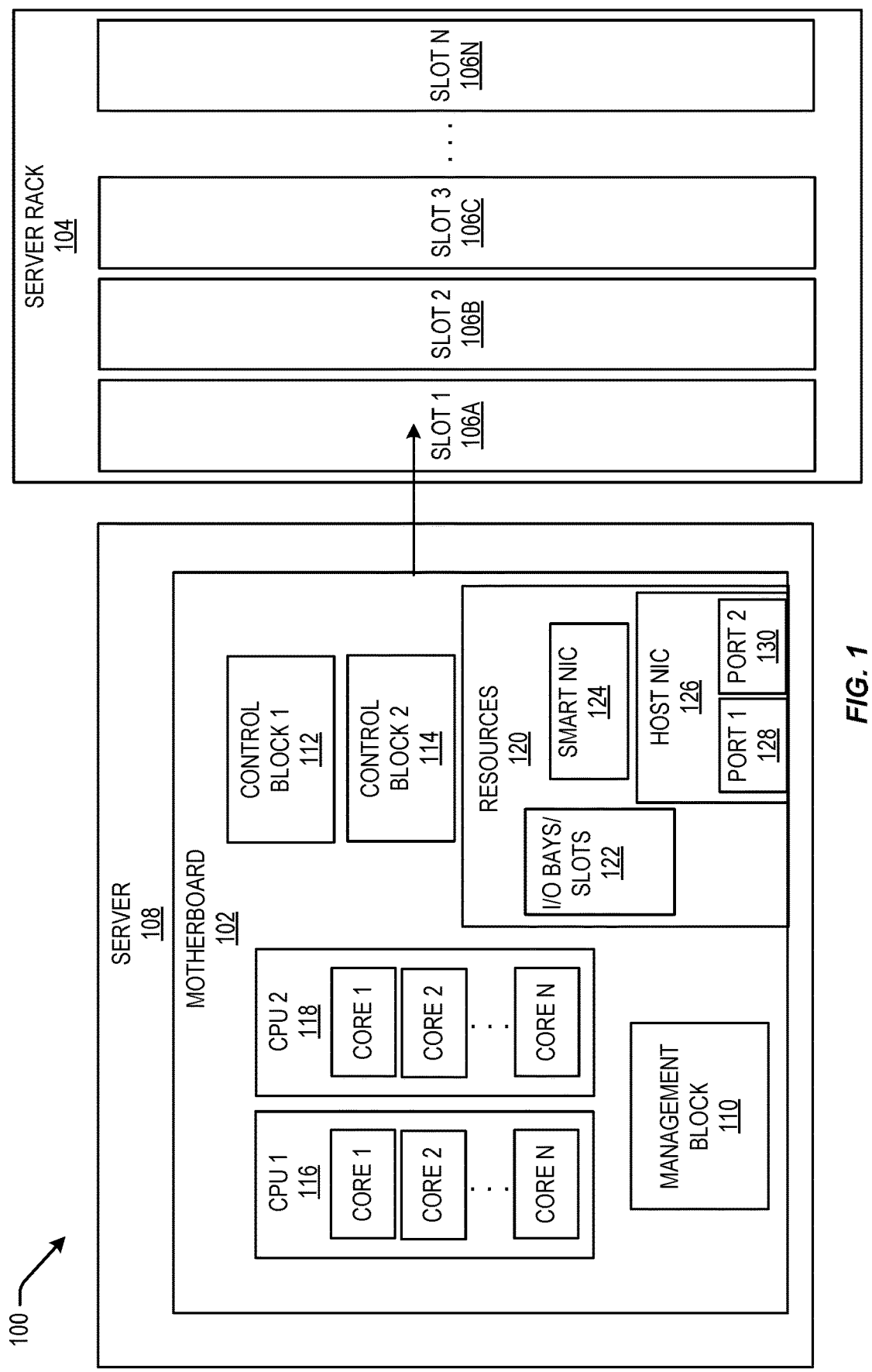
FIG. 1 is a block diagram of an exemplary server environment that utilizes a dynamically configurable motherboard, according to at least one embodiment.

FIG. 1 illustrates an exemplary server environment 100 that utilizes a dynamically configurable motherboard 102, as shown in one exemplary embodiment. As shown, a server rack 104 includes a plurality of slots 106A-N, where each slot 106A-N receives a server. An exemplary server 108 that is inserted into a first slot 106A of the server rack 104 includes a dynamically configurable motherboard 102 that enables operation as multiple independent single-processor systems or a single multiple-processor system.

For example, after the exemplary server 108 is installed within the first slot 106A of the server rack 104 (and is running only on standby power), a management block 110 of the motherboard 102 receives a provisioning request (e.g., from a control layer of a cloud computing environment). The request may include a requested configuration (e.g., to implement the motherboard 102 as multiple independent single-processor systems or as a single multiple-processor system). In response to receiving the provisioning request, the management block 110 (which includes an instance of hardware within the motherboard 102) may set a flag indicating the requested configuration, and the management block 110 may relay the requested configuration to a first control block 112 (e.g., using a serial peripheral interface (SPI) channel between the management block 110 and the first control block 112).

In response to receiving the requested configuration, one or more register bits may be set within the first control block 112 (which may include a field-programmable gate array (FPGA). These register bits may include a partition descriptor that identifies the requested configuration. Logic in the first control block 112 may read these register bits and may be instructed to perform one or more actions.

For example, if the requested configuration indicates that the motherboard 102 is to be implemented as multiple independent single-processor systems, the first control block 112 may implement a second control block 114. The first control block 112 may then configure a first multi-core CPU 116, and the second control block may configure a second multi-core CPU 118. For example, the first multi-core CPU 116 and the second multi-core CPU 118 may be configured to boot independently of each other (e.g., in a disconnected state).

Additionally, if the requested configuration indicates that the motherboard 102 is to be implemented as multiple independent single-processor systems, the management block 110 may configure resources 120 so that they are divided between the first multi-core CPU 116 and the second multi-core CPU 118. For example, the management block 110 may assign a first portion of I/O bays/slots 122 to the first multi-core CPU 116, and the management block 110 may assign a second portion of the I/O bays/slots 122 to the second multi-core CPU 118.

Likewise, the management block 110 may assign a first portion of ports/resources within a smart network interface card (NIC) 124 to the first multi-core CPU 116, and the management block 110 may assign a second portion of ports/resources within the smart NIC 124 to the second multi-core CPU 118. The management block 110 may assign a first port 128 of a host NIC 126 to the first multi-core CPU 116, and the management block 110 may assign a second port 130 of the host NIC 126 to the second multi-core CPU 118.

Further, the motherboard 102 may then come out of standby power and may boot. The first multi-core CPU 116 and the second multi-core CPU 118 may retrieve their own boot code and may operate independently from each other during operation. The first control block 112 may manage the first multi-core CPU 116 during runtime, and the second control block 114 may manage the second multi-core CPU 118 during runtime. The management block 110 may separately manage the first multi-core CPU 116 and the second multi-core CPU 118 during runtime as well.

In another example, if the requested configuration indicates that the motherboard 102 is to be implemented as a single multiple-processor system, the first control block 112 may not implement the second control block 114. The first control block 112 may then configure both the first multi-core CPU 116 and the second multi-core CPU 118 to boot in a connected state.

Additionally, if the requested configuration indicates that the motherboard 102 is to be implemented as a single multiple-processor system, the management block 110 may configure resources 120 only for the first multi-core CPU 116 (and not for the second multi-core CPU 118). For example, the management block 110 may assign all I/O bays/slots 122 to the first multi-core CPU 116, and the management block 110.

Likewise, the management block 110 may assign all ports/resources within a smart network interface card (NIC) 124 to the first multi-core CPU 116, the management block 110 may assign both the first port 128 and the second port 130 of the host NIC 126 to the first multi-core CPU 116.

Further, the motherboard 102 may then come out of standby power and may boot. The first multi-core CPU 116 may retrieve its own boot code and may then link with the second multi-core CPU 118 to boot in a paired configuration. The first control block 112 may manage both the first multi-core CPU 116 and the second multi-core CPU 118 during runtime. The management block 110 may also manage the pairing of the first multi-core CPU 116 and the second multi-core CPU 118 during runtime.

In this way, a single motherboard 102 may function as both multiple independent single-processor systems or a single multiple-processor system, based on an input signal.

Figure 2:
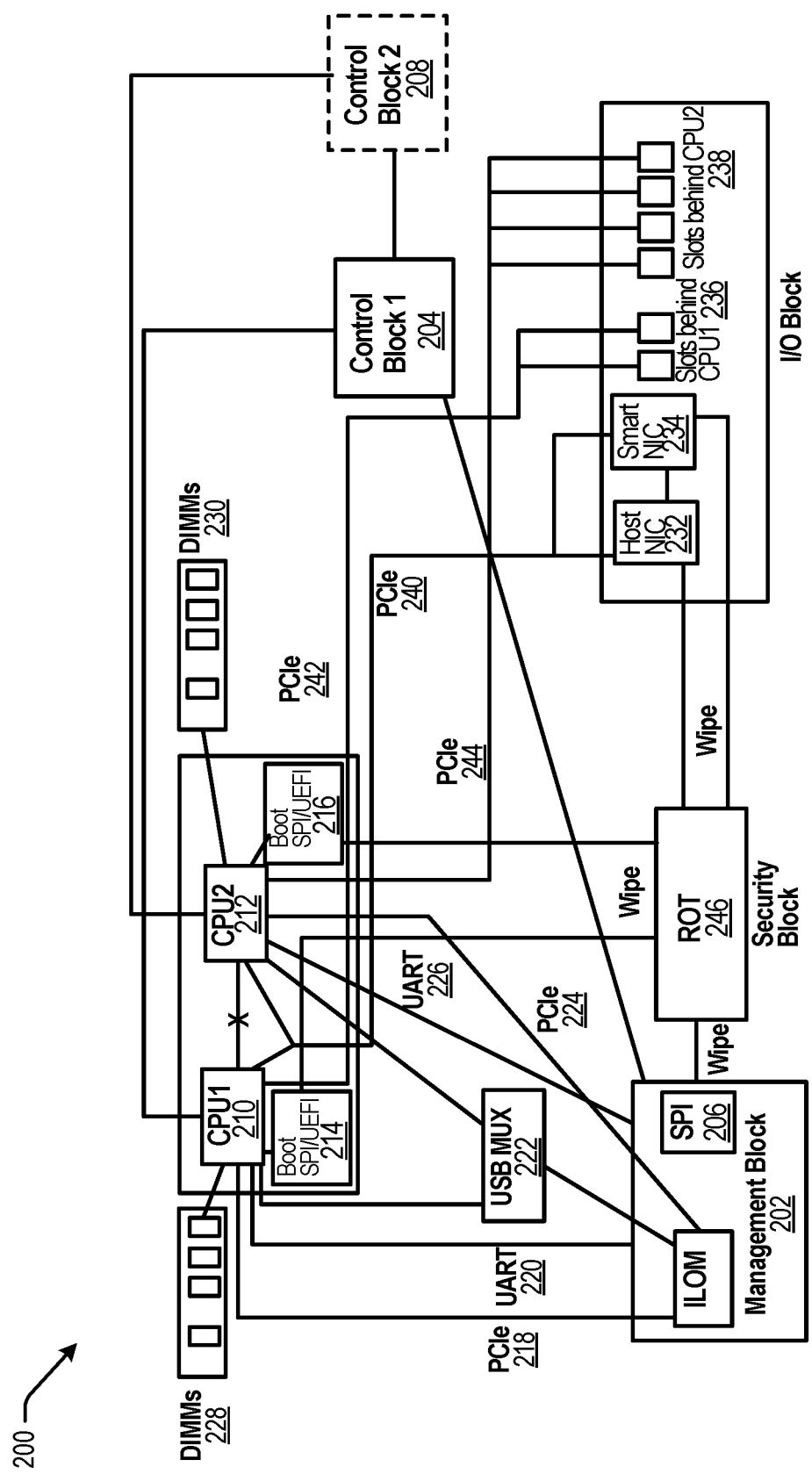
FIG. 2 is a block diagram of an exemplary dynamically configurable motherboard in a multiple independent single-processor system configuration, according to at least one embodiment.

FIG. 2 illustrates an exemplary dynamically configurable motherboard 200 in a multiple independent single-processor system configuration, according to one exemplary embodiment. As shown, while the motherboard 200 is running only on standby power, in response to receiving a request for a multiple independent single-processor system configuration at a management block 202, the management block 202 relays the configuration to a first control block 204 as commands sent using a serial peripheral interface (SPI) and associated channel. The commands set register bits within the first control block 204, and logic in the first control block 204 reads these register bits and is instructed on how to perform.

Additionally, the first control block 204 then implements a second control block 208. The first control block 204 then configures a first CPU 210, while the second control block 208 configures a second CPU 212. For example, the first control block 204 may configure one or more straps on the first CPU 210, where the straps instruct the first CPU 210 to use a local boot SPI/UEFI 214 and not to establish a link to the second CPU 212. The second control block 208 may configure one or more straps on the second CPU 212, where the straps instruct the second CPU 212 to use a local boot SPI/UEFI 216 and to boot in an independent configuration.

Further, the management block 202 then configures the PCIe interface 218, UART interface 220, and USB MUX 222 for the first CPU 210. The management block 202 also configures the PCIe interface 224, UART interface 226, and USB MUX 222 for the second CPU 212. For example, the USB MUX 222 may present USB devices to both the first CPU 210 and the second CPU 212.

Once the motherboard 200 comes out of standby power and boots, the first CPU 210 may receive its boot information from its corresponding UEFI 214, and the second CPU 212 may receive its boot information from its corresponding UEFI 216. During runtime, the first control block 204 manages the first CPU 210, and the second control block 208 manages the second CPU 212. The first CPU 210 utilizes its own DIMM memory 228, while the second CPU 212 utilizes its own DIMM memory 230.

Further still, ports on the host NIC 232 and the smart NIC are shared by both the first CPU 210 and the second CPU 212 via a PCIe interface 240. A first set of I/O bays/slots 236 are dedicated to the first CPU 210 via a PCIe interface 242, and a second set of I/O bays/slots 238 are dedicated to the second CPU 212 via another PCIe interface 244. Also, the route of trust (ROT) 246 sends different ROT images to the first CPU 210 and the second CPU 212.

Figure 3:
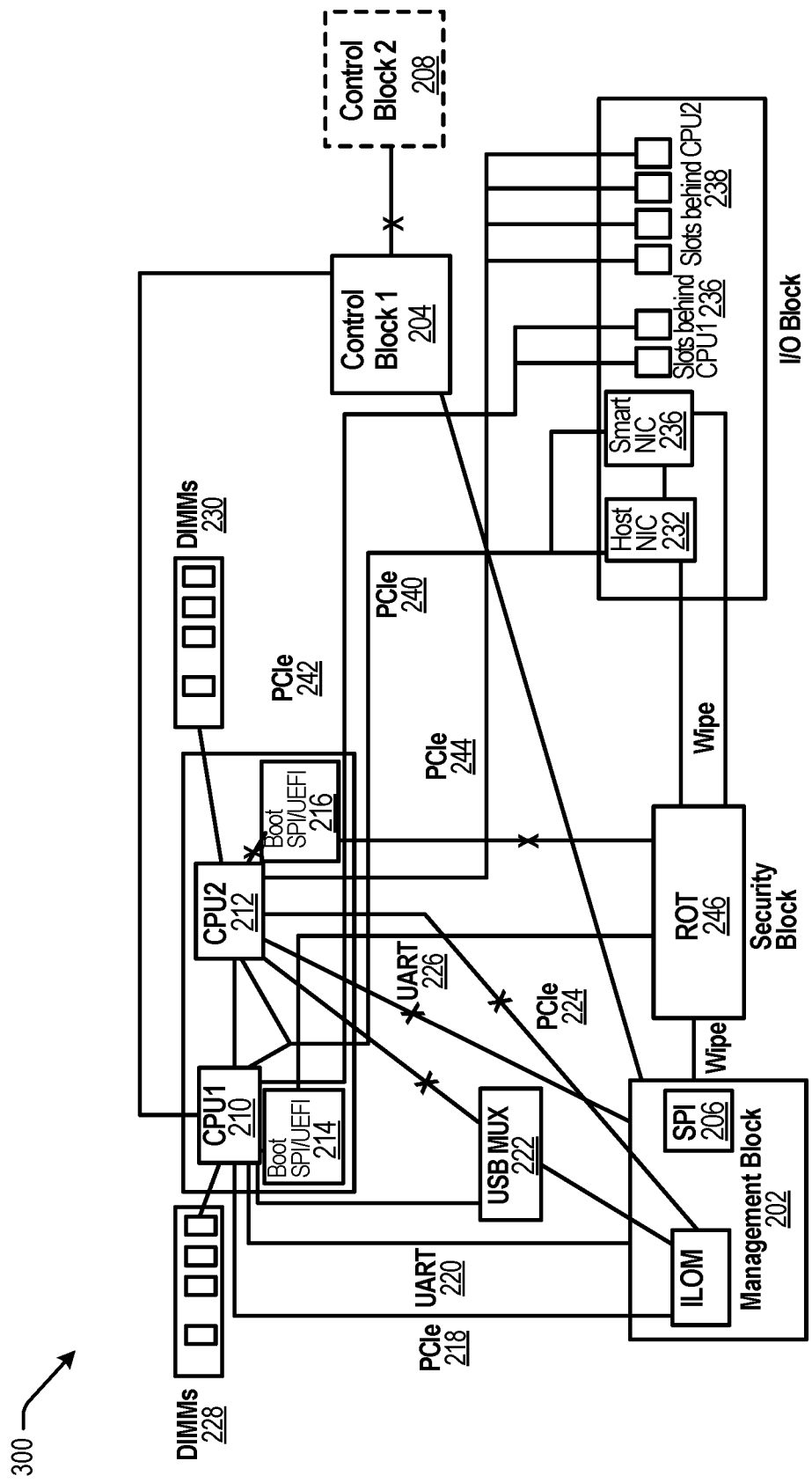
FIG. 3 is a block diagram of an exemplary dynamically configurable motherboard in a single multiple-processor system configuration, according to at least one embodiment.

FIG. 3 illustrates an exemplary dynamically configurable motherboard 300 in a single multiple-processor system configuration, according to one exemplary embodiment. As shown, while the motherboard 200 is running only on standby power, in response to receiving a request for a single multiple-processor system configuration at a management block 202, the management block 202 relays the configuration to a first control block 204 as commands sent using a serial peripheral interface (SPI) and associated channel. The commands set register bits within the first control block 204, and logic in the first control block 204 reads these register bits and is instructed on how to perform.

Additionally, the first control block 204 does not implement a second control block 208. The first control block 204 configures both a first CPU 210 and a second CPU 212. For example, the first control block 204 may configure one or more straps on the first CPU 210, where the straps instruct the first CPU 210 to use a local boot SPI/UEFI 214 and to establish a link to the second CPU 212. The first control block 204 may configure one or more straps on the second CPU 212, where the straps instruct the second CPU 212 to disable a local boot SPI/UEFI 216 and wait for a link from the first CPU 210 to boot in a paired configuration.

Further, the management block 202 then configures the PCIe interface 218, UART interface 220, and USB interface 222 for the first CPU 210, and does not configure the PCIe interface 224, UART interface 226, and USB interface 222 for the second CPU 212. For example, the USB MUX 222 may present USB devices to only the first CPU 210 and not to the second CPU 212.

Once the motherboard 200 comes out of standby power and boots, the first CPU 210 may receive its boot information from its corresponding UEFI 214. The first CPU 210 may then link with the second CPU 212 and the first CPU 210 and second CPU 212 may boot in a paired configuration. During runtime, the first control block 204 manages both the first CPU 210 and the second CPU 212. The first CPU 210 and the second CPU 212 share DIMM memory 228 and DIMM memory 230.

Further still, ports on the host NIC 232 and the smart NIC are shared by both the first CPU 210 and the second CPU 212 via a PCIe interface 240. A first set of I/O bays/slots 236 are accessed by the first CPU 210 via a PCIe interface 242, and a second set of I/O bays/slots 238 are accessed by the second CPU 212 via another PCIe interface 244. Also, the route of trust (ROT) 246 sends a single ROT image to the first CPU 210.

Figure 4:
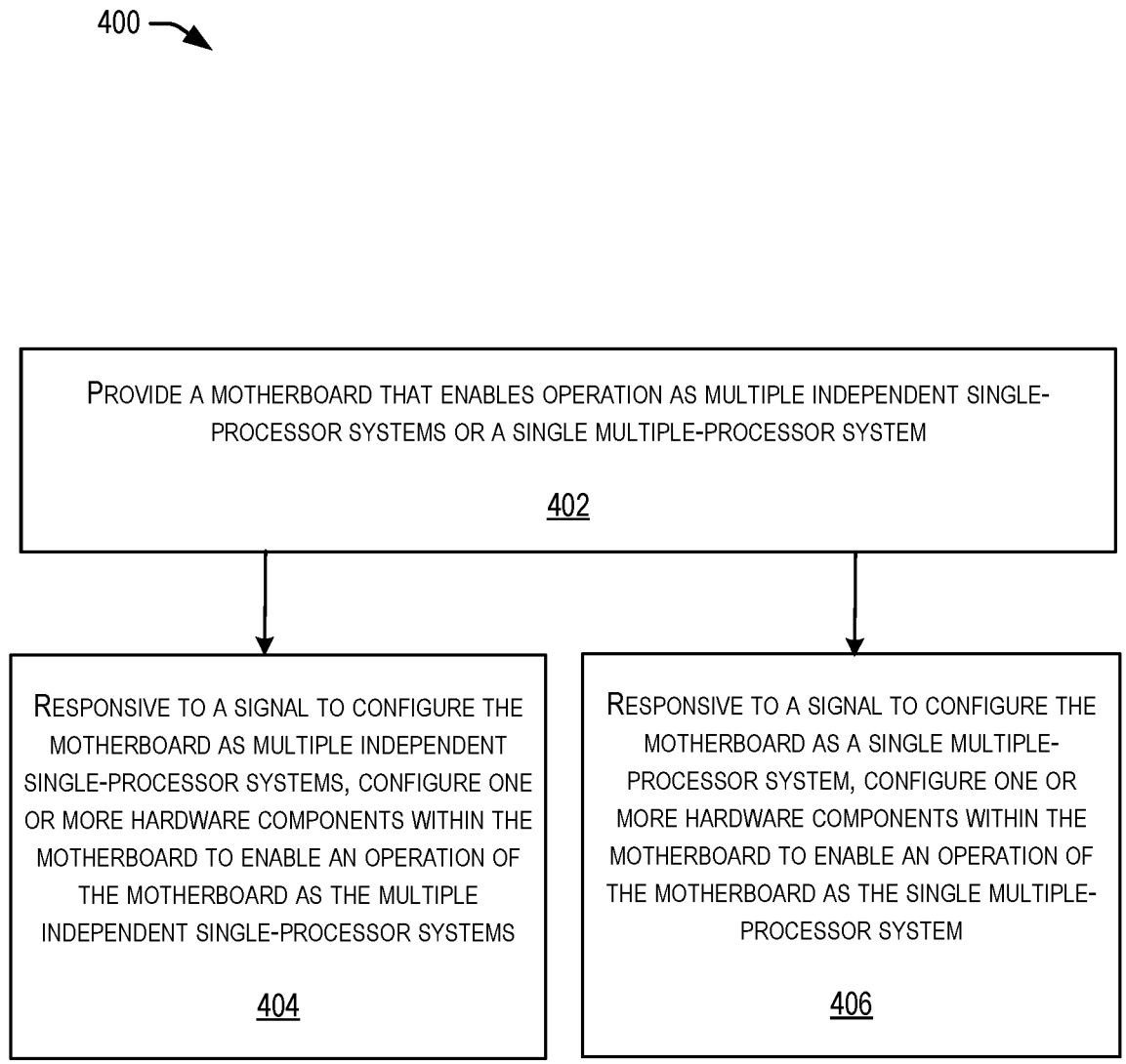
FIG. 4 illustrates an example method for implementing a dynamically configurable motherboard, according to at least one embodiment.

FIG. 4 illustrates an example method 400 for implementing a dynamically configurable motherboard, according to at least one embodiment. The method 400 may be performed by one or more components of FIGS. 1-3. A computer-readable storage medium comprising computer-readable instructions that, upon execution by one or more processors of a computing device, cause the computing device to perform the method 400. The method 400 may performed in any suitable order. It should be appreciated that the method 400 may include a greater number or a lesser number of steps than that depicted in FIG. 4.

The method 400 may begin at 402, where a motherboard is provided that enables operation as multiple independent single-processor systems or a single multiple-processor system. In various embodiments, multiple hardware processors (such as central processing units (CPUs), graphics processing units (GPUs), etc.) may communicate with a single motherboard of a computer system via an independent socket of the motherboard. In another example, the hardware processors may share a single power supply and network interface card (NIC). In various embodiments, the computer system may be connected to a plurality of additional computer systems (e.g., as part of a cloud computing environment, etc.).

Additionally, at 404, responsive to a signal to configure the motherboard as multiple independent single-processor systems, one or more hardware components within the motherboard are configured to enable an operation of the motherboard as the multiple independent single-processor systems. In various embodiments, the signal may include a request to perform one or more workloads at the computer system that includes the motherboard.

Further, in various embodiments, each of the one or more workloads may be associated with a tenant of a multi-tenant system implemented within the cloud computing environment. In various embodiments, the request may include instructions to implement a single workload for a single tenant on a single multiple-processor system. Also, in various embodiments, the request may include instructions to implement multiple workloads for different tenants within a plurality of independent single-processor systems. For example, the request may include instructions to implement a first workload for a first tenant at a first single processor system, and to implement a second workload for a second tenant (that is different from the first tenant) at a second single processor system separate from the first single processor system.

In addition, in various embodiments, the request may be received from a control layer of a cloud computing environment. For example, the control layer may be implemented within the cloud computing environment to facilitate an implementation of the multi-tenant system within the cloud computing environment. In various embodiments, the request may be received at management hardware (such as a management block) within the motherboard. For example, the management hardware may communicate with the control layer via a network interface (such as an ethernet connection).

Furthermore, in various embodiments, the request may also include a firmware validation for the motherboard, a confirmation that data associated with a previous tenancy has been removed from the motherboard, etc. In various embodiments, in response to receiving the request, the motherboard may set a flag (such as a partition flag) within the management hardware that indicates the desired configuration of the motherboard (e.g., a first configuration implementing a plurality of independent single-processor systems or a second configuration implementing a single multiple-processor system).

Further still, in various embodiments, the motherboard may be in a standby mode when the request is received. For example, the management hardware may be running on auxiliary power in a standby power mode when the management hardware receives the request.

Also, in various embodiments, in response to the signal to configure the motherboard as multiple independent single-processor systems, one or more hardware settings within the motherboard may be configured to enable an operation of the motherboard as the plurality of independent single-processor systems. In various embodiments, one or more commands indicating the desired configuration may be sent from the management hardware of the motherboard to control hardware (such as a control block) of the motherboard. For example, the control block may include an integrated circuit such as a field-programmable gate array (FPGA).

Additionally, in various embodiments, the management hardware may send the desired configuration to the control hardware via a serial peripheral interface (SPI) channel. In various embodiments, both the management hardware and the control hardware may be running on auxiliary power in a standby power mode when the management hardware sends the one or more commands to the control hardware. Further, in various embodiments, the one or more commands sent by the management hardware may set one or more predetermined register bits within the control hardware. These predetermined register bits may include a partition descriptor that identifies the desired configuration (e.g., a plurality of independent single-processor systems).

Further still, in various embodiments, logic within the control hardware may be instructed by these register bits to perform multiple configuration actions to implement the multiple independent single-processor systems within the motherboard. In various embodiments, the register bits may instruct a single instance of the control hardware to implement one or more additional instances of the control hardware, where each instance of the control hardware may manage a single processor mounted on the motherboard separately from the other processors. For example, each instance of control hardware may be implemented within a single FPGA. In another example, each additional instance of control hardware may include an additional FPGA separate from the FPGA representing the initial single instance of the control hardware.

Also, in various embodiments, each instance of the control hardware may be assigned to a single processor mounted on the motherboard. In various embodiments, each instance of the control hardware may configure their corresponding single processor to boot independently of the other processors. For example, each control hardware instance may send one or more hardware signals to their corresponding single processor to configure one or more straps within the processor. In another example, straps within a processor may include pin straps that are configured by hardware signals.

In another example, a first control hardware instance for a first CPU may configure one or more straps on the first CPU to use a local boot SPI and to look for local boot information at a local BIOS, and not to establish a link with additional CPUs. In yet another example, a second control hardware instance for a second CPU may configure one or more straps on the second CPU to use a local boot SPI, look for local boot information at a local BIOS, and to boot in an independent configuration.

In addition, in various embodiments, the management hardware within the motherboard may assign separate resources to each of the processors. For example, the management hardware may configure separate communication interfaces for each of the processors. The communication interfaces may include a universal serial bus (USB) interface, a universal asynchronous receiver-transmitter (UART) interface, a peripheral component interconnect express (PCIe) interface, etc. In another example, the management hardware may perform such configuration in response to identifying the configuration indicated by the configuration flag within the management hardware. Each of the processors may be provided exclusive access to its own dual in-line memory module (DIMM) slots, as well as its own separate local memory and caches.

Furthermore, in various embodiments, the motherboard may then be booted as the plurality of independent single-processor systems. For example, each of the plurality of hardware processors may retrieve their own boot code from their own local BIOS. In another example, utilizing the retrieved boot code, each of the plurality of hardware processors may be initialized independently of the other hardware processors, and may boot independently of the other hardware processors. In yet another example, each of the plurality of hardware processors may then be utilized by a distinct operating system (OS) or software running one or more virtual machines (e.g., a hypervisor, etc.).

Further still, in various embodiments, during operation, each of the plurality of hardware processors mounted on the motherboard may operate independently from the other processors of the computer system. For example, each processor may communicate with its own instance of control hardware and may utilize its own local boot SPI and local BIOS that are separate from the other processors. In another example, for each processor, its corresponding control hardware instance may manage the processor during runtime. In yet another example, the control hardware may reset resources for the processor, propagate error signals for the processor, confirm power for the processor, etc. In still another example, each instance of control hardware may operate in isolation from the other instances of control hardware.

Also, in various embodiments, in response to determining an error within a single processor, that single processor may be powered down by its corresponding control hardware instance, while the other processors within the computer system are maintained in operation by their corresponding control hardware instances. In various embodiments, the management hardware within the motherboard may separately manage each of the plurality of hardware processors during operation. For example, a processor parameter may be added to communications between the management hardware and the control hardware, where this processor parameter identifies the processor to which specific requests (such as reset requests, power off requests, etc.) are sent. In another example, in response to receiving, from the management hardware, a request including the processor parameter, the control hardware may perform the requested operations on the specific processor indicated by the processor parameter.

Additionally, in various embodiments, the management hardware may also provide, via an application programming interface (API), selective control for each processor. For example, the control layer may request one or more actions (e.g., reset, power off, etc.) and other events for each independent processor.

Further, at 406, responsive to a signal to configure the motherboard as a single multiple-processor system, one or more hardware components within the motherboard are configured to enable an operation of the motherboard as the single multiple-processor system. In various embodiments, the signal may include a request indicating that the motherboard is to operate as the single multiple-processor system. Also, in various embodiments, one or more hardware settings may be configured within the motherboard to enable an operation of the computer system as the single multiple-processor system. In various embodiments, one or more commands indicating the desired configuration may be sent from the management hardware of the motherboard to control hardware (such as a control block) of the computer system.

Further still, in various embodiments, the management hardware may send the desired configuration to the control hardware via a serial peripheral interface (SPI) channel. In various embodiments, both the management hardware and the control hardware may be running on auxiliary power in a standby power mode when the management hardware sends the one or more commands to the control hardware. Also, in various embodiments, the one or more commands sent by the management hardware may set one or more predetermined register bits within the control hardware. For example, these predetermined register bits may include a partition descriptor that identifies the desired configuration.

In addition, in various embodiments, logic within the control hardware may be instructed by these register bits to perform a plurality of configuration actions to implement the single multi-processor system within the motherboard. In various embodiments, the register bits may instruct the control hardware to not implement/deactivate any additional instances of the control hardware, such that a single instance of the control hardware may manage all processors of the computer system. For example, the single instance of control hardware may be implemented within a single FPGA.

Further, in various embodiments, the single instance of the control hardware may be assigned to all processors mounted on the motherboard. In various embodiments, the control hardware may configure all processors to boot in a connected state. For example, the single control hardware instance may send one or more hardware signals to each of the plurality of processors to configure one or more straps within each of the processors. In another example, straps within a processor may include pin straps that are configured by hardware signals.

In another example, the control hardware may configure one or more straps on the first CPU to use a local boot SPI and to look for local boot information at a local BIOS, and to establish a link with a second CPU. In yet another example, the same control hardware may configure one or more straps on the second CPU to disable a local boot SPI and local BIOS, to not look for local boot information at a local BIOS, and to wait for a link with the first CPU before booting in a paired configuration.

Further still, in various embodiments, the management hardware within the motherboard may assign resources to only a single processor mounted to the motherboard. For example, the management hardware may configure a communication interface only for one of the processors and may not configure a communication interface for the additional processors. The communication interface may include a universal serial bus (USB) interface, a universal asynchronous receiver-transmitter (UART) interface, a peripheral component interconnect express (PCIe) interface, etc. In another example, the management hardware may perform such configuration in response to identifying the configuration indicated by the configuration flag within the management hardware.

Also, in various embodiments, additional resources of the motherboard may be shared between all processors mounted on the motherboard. For example, all of the processors may be provided shared access to dual in-line memory module (DIMM) slots, local memory and caches within the computer system. In various embodiments, the computer system may then be booted as a single multi-processor system. For example, the first processor may retrieve its boot code from its local BIOS. In another example, utilizing the retrieved boot code, the first processor may be initialized, and may link to a second processor. In yet another example, both the first processor and the second processor may then boot in a paired configuration. In still another example, all of the processors may be utilized as a single unit by a single operating system (OS) or software running one or more virtual machines (e.g., a hypervisor, etc.).

Additionally, in various embodiments, during operation, all of the plurality of hardware processors within the computer system may operate together within the motherboard. For example, one instance of control hardware may communicate with and manage all processors, and only the first processor may utilize its own local boot SPI and local BIOS. In another example, the control hardware may reset resources for all processors, propagate error signals for all processors, confirm power for all processors, etc.

Furthermore, in various embodiments, in response to determining an error within a single processor, all processors may be powered down by the control hardware. In various embodiments, the management hardware within the motherboard manages all of the plurality of hardware processors during operation. For example, in response to receiving, from the management hardware, a request, the control hardware may perform the requested operations on all processors.

Further still, in various embodiments, the management hardware may also provide, via an application programming interface (API), control for the combination of all processors. In another embodiment, the control layer may request one or more actions (e.g., reset, power off, etc.) and other events to be applied only to the combination of all processors.

Also, in various embodiments, a request may be received at the motherboard indicating that a configuration of the computer system is to be changed. For example, if the motherboard is currently operating as a plurality of independent single-processor systems, the request may indicate that the motherboard is to be changed such that is operates as a single multiple-processor system. In another example, if the motherboard is currently operating as a single multiple-processor system, the request may indicate that the motherboard is to be changed such that is operates as a plurality of independent single-processor systems. In yet another example, in response to receiving the request, the motherboard (and entire computer system containing the motherboard) may be powered down, and a new provisioning request indicating the desired configuration may be sent from the control layer to the management hardware of the motherboard.

In this way, a single motherboard and multiple processors may operate either as a multiple independent single-processor systems or as a single multiple-processor system. This dynamic flexibility may minimize hardware implementation costs by avoiding the need to pre-set the computer system with a single static configuration during the manufacture of the motherboard. The motherboard may be configured as a plurality of independent single-processor systems to provide optimal performance without cross-socket NUMA latencies for workloads that benefit from single-processor implementations. The motherboard may also be configured as a single multiple-processor system to provide a more cost-effective processing solution (e.g., multiple processors with shared power, motherboard, and input/output (I/O)) for workloads that can be implemented utilizing a multiple-processor configuration.

FIG. 4 illustrates an example method 500 for implementing multiple independent single-processor systems within a dynamically configurable motherboard, according to at least one embodiment. The method 500 may be performed by one or more components of FIGS. 1-3. A computer-readable storage medium comprising computer-readable instructions that, upon execution by one or more processors of a computing device, cause the computing device to perform the method 500. The method 500 may performed in any suitable order. It should be appreciated that the method 500 may include a greater number or a lesser number of steps than that depicted in FIG. 5.

The method 500 may begin at 502, where a request to provision multiple independent single-processor systems within a motherboard is received at a management block of the motherboard by a control layer of a cloud computing environment. In various embodiments, the management block may have a network (ethernet) interface enabling communication with the control layer.

Also, in various embodiments, the provisioning request may include a firmware validation for the motherboard, a confirmation that old tenancy data has been removed from the motherboard, etc. In various embodiments, the provisioning request may include a desired motherboard configuration. For example, the provisioning request may indicate that a multiple independent single-processor system configuration is desired. The provisioning request may also include a include a flag (such as a partition flag) within the management block that is set by the control layer and that indicates the desired configuration.

Additionally, in various embodiments, the provisioning request may be sent by the control layer in response to an assignment request. For example, an assignment request may be received from a tenant of a multi-tenant environment for a bare metal server (BMS) in a single-processor configuration. In another example, the request may include a new attribute to indicate a desired (combined or separate) server configuration for the BMS. For example, a request for a bare metal server (e.g., a single computer server to be used by a single tenant) may be received from the single tenant within the multi-tenant system. The request for the bare metal server may include an attribute that indicates a configuration of the requested bare metal server. For instance, the attribute may indicate whether the requested bare metal server is to be a single-processor system.

Further, at 504, a multiple independent single-processor system configuration is sent from the management block of the motherboard to a first control block of the motherboard. In various embodiments, when the provisioning request is received, the motherboard may be in a standby mode where the management block and control block are running off auxiliary power in a standby power mode. Further still, in various embodiments, while the motherboard is still in the standby power mode, the management block may send commands to the first control block via a serial peripheral interface (SPI) channel, where interfaces reside on both the management block and the first control block.

In various embodiments, the commands may set register bits in the first control block. For example, the register bits may include predetermined bits (indicating the desired server configuration) in a corresponding field-programmable gate array (FPGA) that are set by the commands sent from the management block. In another example, these predetermined bits may include a partition descriptor that identifies the multiple independent single-processor system configuration. In various embodiments, logic in the FPGA may read these register bits and the FPGA may be instructed on how to perform based on such bits.

Also, at 506, the first control block of the motherboard implements a second control block of the motherboard, where the first control block manages a first central processing unit (CPU) of a first single-processor system and the second control block manages a second CPU of a second single-processor system. In various embodiments, the first CPU may be managed separately from the second CPU. In addition, in various embodiments, the first control block and the second control block may both be implemented within a single FPGA. In various embodiments, the second control block may constitute a second FPGA outside of the first control block. In various embodiments, the second control block may be activated/implemented in response to register bits set in the FPGA.

Furthermore, at 508, the first control block and the second control block configure corresponding first and second CPUs to boot independently of each other within the motherboard. In various embodiments, the corresponding control block for each CPU may configure one or more straps on that CPU. For example, hardware signals may be sent from the first control block to configure straps within the first CPU, and hardware signals may be sent from the second control block to configure straps within the second CPU. These straps may include pin straps that are an element within the CPU that are configured by the hardware signals.

In various embodiments, the straps on the first CPU may be configured to use a local boot SPI and look for local boot information at a local UEFI/BIOS, and not to establish a link with the second CPU. The straps on the second CPU may be configured to use a local boot SPI, to look for local boot information at a local UEFI/BIOS, and to boot in an independent configuration.

Further still, at 510, the management block of the motherboard configures resources of the motherboard so that both the first single-processor system and the second single-processor system have their own set of resources within the motherboard. In various embodiments, the management block may configure interfaces provided by the motherboard for both the first CPU and the second CPU.

For example, the management block may configure USB, UART, and PCIe interfaces within the motherboard so that they may be used by the first CPU. In various embodiments, the management block may also configure USB, UART, and PCIe interfaces within the motherboard so that they may be used by the second CPU. In various embodiments, such configuration may be performed in response to the management block identifying a flag that indicates a multiple independent single-processor system configuration.

Also, at 512, the first single-processor system is initialized with the first CPU of the motherboard, and the second single-processor system is initialized with the second CPU of the motherboard. In various embodiments, the first CPU may be booted separately from the second CPU. For example, the first CPU may retrieve its own boot code from its own local UEFI/BIOS, and the second CPU may retrieve its own boot code from its own local UEFI/BIOS. In another example, the first CPU and the second CPU may be independently initialized and handed off to its corresponding OS/hypervisor.

Additionally, in various embodiments, the first CPU may operate independently from the second CPU during operation. For example, each CPU may have its own DIMM slots and may access its own separate local memory/caches. Each CPU may communicate with its own control block (FPGA) and may utilize its own boot SPI module/UEFI.

Further, in various embodiments, the first control block may manage the first CPU during runtime, and the second control block may manage the second CPU during runtime. This management may include resetting resources for the CPU, propagating error signals, confirming power, etc. In this way, the first control block and the second control block may operate in isolation from each other. In response to an error detected on the first CPU, the first CPU may be powered down by the first control block, while the second CPU may be maintained in operation by the second control block. Likewise, in response to an error detected on the second CPU, the second CPU may be powered down by the second control block, while the first CPU may be maintained in operation by the first control block.

Further still, in various embodiments, the management block may separately manage the first CPU and the second CPU during operation. For example, the management block may add a new CPU parameter to communications with the system control block. This new parameter may identify a specific CPU (e.g., the first CPU or the second CPU) to which specific requests (reset, power off) are sent. The system control block may then perform operations on the specific CPU indicated by the parameter, in response to the request. The management block may also expose, in its API, selective control for each independent CPU. For example, the control layer can request server reset, power off, and other events for each independent CPU.

Also, in various embodiments, if a current motherboard configuration is to be changed, the entire motherboard (including both CPUs) is shut down, and a new provisioning request (indicating new desired configuration) may then be sent from the control layer to the management block of the motherboard.

Figure 6:
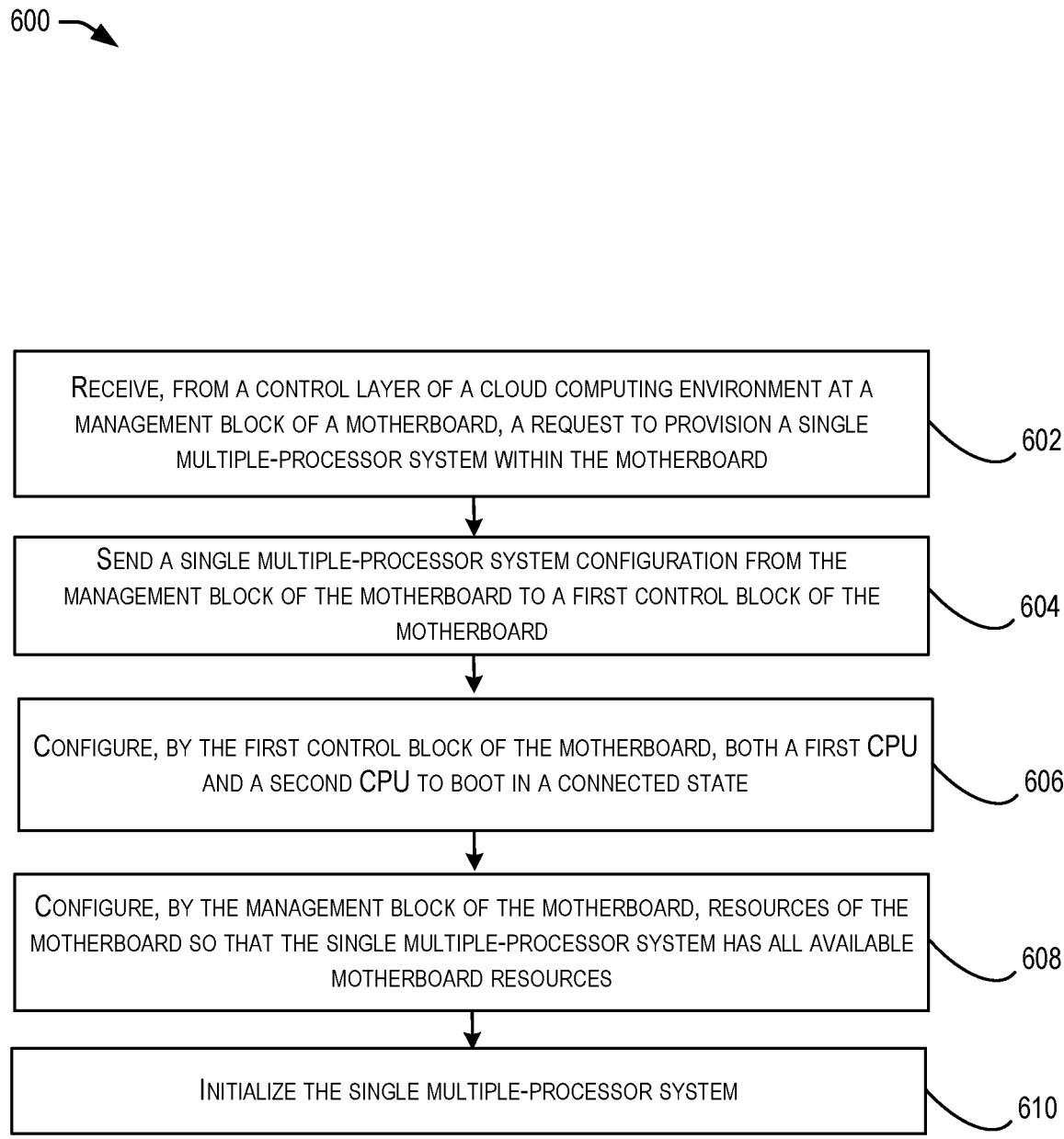
FIG. 6 illustrates an example method for implementing a single multiple-processor system within a dynamically configurable motherboard, according to at least one embodiment.

FIG. 6 illustrates an example method 600 for implementing a single multiple-processor system within a dynamically configurable motherboard, according to at least one embodiment. The method 600 may be performed by one or more components of FIGS. 1-3.

A computer-readable storage medium comprising computer-readable instructions that, upon execution by one or more processors of a computing device, cause the computing device to perform the method 600. The method 600 may performed in any suitable order. It should be appreciated that the method 600 may include a greater number or a lesser number of steps than that depicted in FIG. 6.

The method 600 may begin at 602, where a request to provision a single multiple-processor system within a motherboard is received at a management block of the motherboard by a control layer of a cloud computing environment. In various embodiments, the management block may have a network (ethernet) interface enabling communication with the control layer.

Also, in various embodiments, the provisioning request may include a firmware validation for the motherboard, a confirmation that old tenancy data has been removed from the motherboard, etc. In various embodiments, the provisioning request may include a desired motherboard configuration. For example, the provisioning request may indicate that a single multiple-processor configuration is desired. The provisioning request may also include a include a flag (such as a partition flag) within the management block that is set by the control layer and that indicates the desired configuration.

Additionally, in various embodiments, the provisioning request may be sent by the control layer in response to an assignment request. For example, an assignment request may be received from a tenant of a multi-tenant environment for a bare metal server (BMS) in a multiple-processor configuration. In another example, the request may include a new attribute to indicate a desired (combined or separate) server configuration for the BMS. For example, a request for a bare metal server (e.g., a single computer server to be used by a single tenant) may be received from the single tenant within the multi-tenant system. The request for the bare metal server may include an attribute that indicates a configuration of the requested bare metal server. For instance, the attribute may indicate that the requested bare metal server is to be a multiple-processor system.

Further, at 604, a single multiple-processor system configuration is sent from the management block of the motherboard to a first control block of the motherboard. In various embodiments, when the provisioning request is received, the motherboard may be in a standby mode where the management block and control block are running off auxiliary power in a standby power mode. Further still, in various embodiments, while the motherboard is still in the standby power mode, the management block may send commands to the first control block via a serial peripheral interface (SPI) channel, where interfaces reside on both the management block and the first control block.

In various embodiments, the commands may set register bits in the first control block. For example, the register bits may include predetermined bits (indicating the desired server configuration) in a corresponding field-programmable gate array (FPGA) that are set by the commands sent from the management block. In another example, these predetermined bits may include a partition descriptor that identifies the multiple independent single-processor system configuration. In various embodiments, logic in the FPGA may read these register bits and the FPGA may be instructed on how to perform based on such bits.

Also, at 606, the first control block of the motherboard configures both a first CPU and a second CPU to boot in a connected state. In various embodiments, the first control block may be implemented within a single FPGA. In various embodiments, the first control block may not implement a second control block within the motherboard to manage the second CPU separately from the first CPU. Instead, the control block configures one or more straps on the first CPU and the second CPU, where the straps on the first CPU are configured to use a local boot SPI, to look for local boot information at a local UEFI/BIOS, and to establish a link with the second CPU. The straps on the second CPU may be configured by the first control block to disable a local boot SPI, to not look for local boot information, and to wait for a link with the first CPU before booting in a paired configuration. In this way, the local UEFI/BIOS for the second CPU may be disabled.

Further still, at 608, the management block of the motherboard configures resources of the motherboard so that the single multiple-processor system has all available motherboard resources. For example, the management block may configure interfaces for only the first CPU. In another example, the management block may configure USB, UART, and PCIe interfaces to the first CPU, and may not enable/configure USB, UART, and PCIe interfaces to the second CPU. These actions may be performed in response to the management block identifying a flag that indicates a single multiple-processor system configuration.

Also, at 610, the single multiple-processor system is initialized. In various embodiments, both the first CPU and the second CPU may be booted in a paired configuration. For example, the first CPU may retrieve its own boot code from its own local UEFI/BIOS, and the first CPU may then link with the second CPU, where both CPUs boot in a paired configuration. In another example, the first and second CPU may also operate in a paired configuration. For instance, both the first and second CPUs may share motherboard resources (such as DIMM slots, memory, caches, etc.) and both the first and second CPUs may communicate via a single control block (FPGA) and may utilize a single SPI module/UEFI.

Additionally, in various embodiments, the control block may manage both the first and second CPUs during runtime. For example, this management may include resetting resources for both CPUs, propagating error signals, confirming power, etc. In various embodiments, both the first CPU and the second CPU may be powered down in response to one or more errors detected on the first CPU. Likewise, both the first CPU and the second CPU may be powered down in response to one or more errors detected on the second CPU.

Further, in various embodiments, the management block may manage both the first and second CPUs during operation. For example, the management block may send specific requests (e.g., reset, power off, etc.) to the system control block. The system control block may then perform the requested operations on the first and second CPUs. The management block may also expose, in its API, selective control for the pair of first and second CPUs, and the control layer may request server reset, power off, and other events only for the pair of first and second CPUs.

Also, in various embodiments, if a current server configuration is to be changed, the entire motherboard (including both CPUs) are shut down, and a new provisioning request (indicating new desired configuration) may then be sent from the control layer to the management block of the motherboard.

Figure 7:
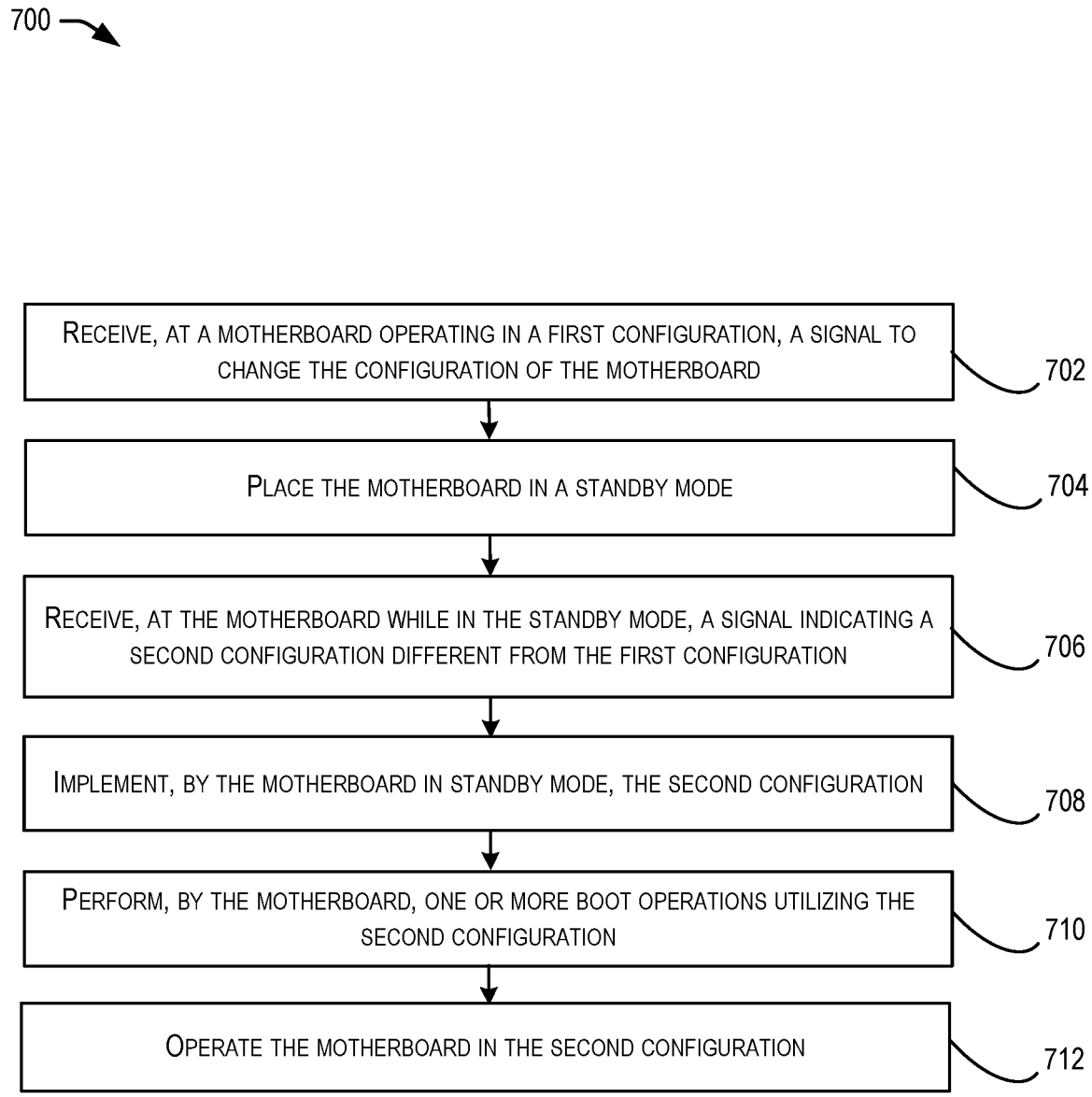
FIG. 7 illustrates another example method for switching a configuration of a synamically configurable motherboard, according to at least one embodiment.

FIG. 7 illustrates another example method 700 for switching a configuration of a synamically configurable motherboard, according to at least one embodiment. The method 700 may be performed by one or more components of FIGS. 1-3. A computer-readable storage medium comprising computer-readable instructions that, upon execution by one or more processors of a computing device, cause the computing device to perform the method 700. The method 700 may performed in any suitable order. It should be appreciated that the method 700 may include a greater number or a lesser number of steps than that depicted in FIG. 7.

The method 700 may begin at 702, where a motherboard operating in a first configuration receives a signal to change the configuration of the motherboard. In various embodiments, the first configuration may include a multiple independent single-processor system configuration where the motherboard facilitates the operation of multiple independent single-processor systems. Additionally, in various embodiments, the first configuration may include a single multiple-processor system configuration where the motherboard facilitates the operation of a single multiple-processor system. In various embodiments, the signal may be received at a management block of the motherboard (e.g., from a control layer of a cloud computing environment).

Further, as shown in operation 704, the motherboard is placed in a standby mode. For example, the management block of the motherboard may send a reset or power off request to the system control block, and the system control block may implement the request by shutting down the motherboard and placing the motherboard in the standby mode.

Further still, as shown in operation 706, while in standby mode, the motherboard receives a signal indicating a second configuration different from the first configuration. For example, if the first configuration for the motherboard is a multiple independent single-processor system configuration, the second configuration may be a single multiple-processor system configuration. Likewise, if the first configuration for the motherboard is a single multiple-processor system configuration, the second configuration may be a multiple independent single-processor system configuration.

Figure 5:
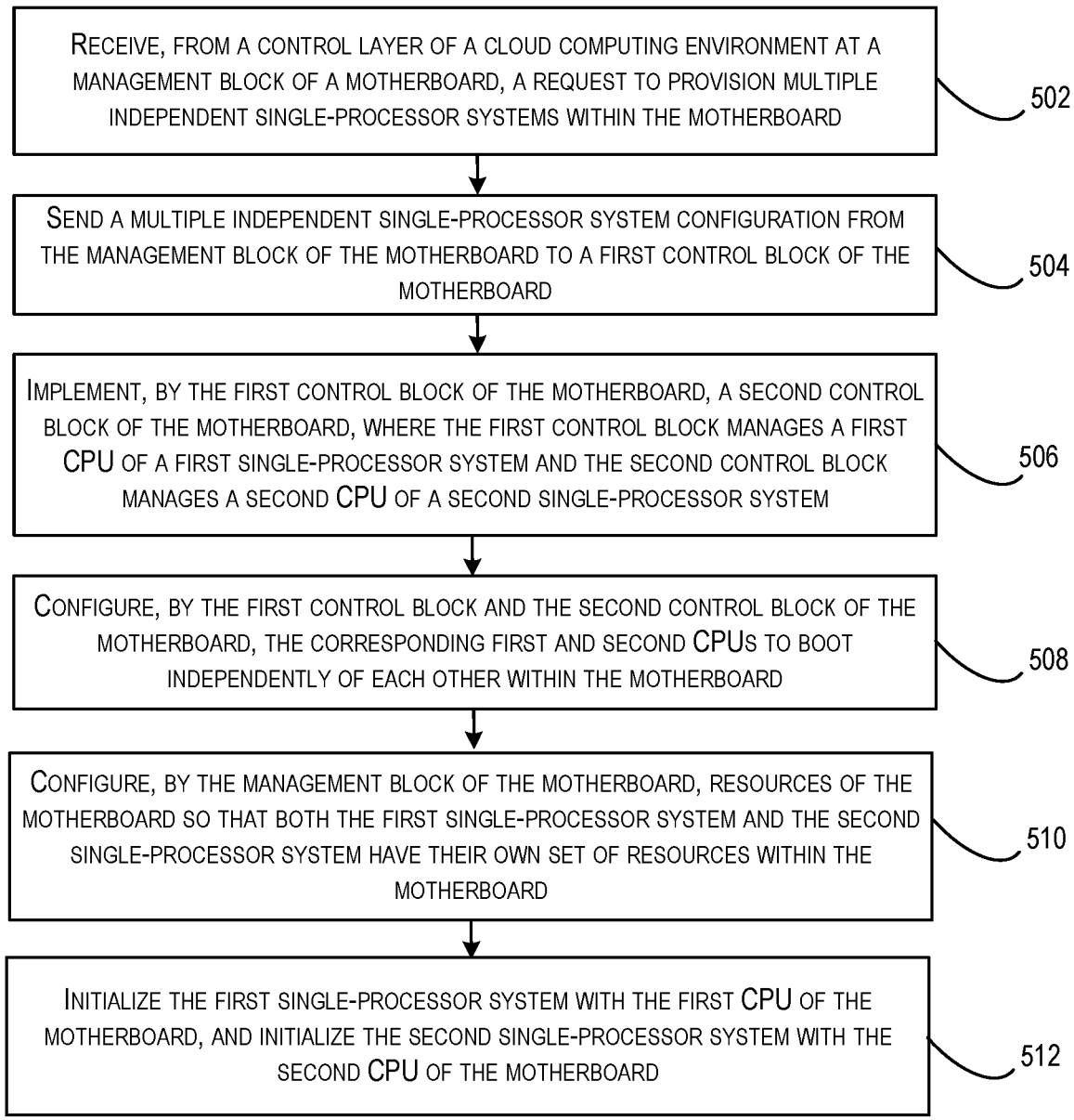
FIG. 5 illustrates an example method for implementing multiple independent single-processor systems within a dynamically configurable motherboard, according to at least one embodiment.

Also, as shown in operation 708, the motherboard implements the second configuration while in standby mode. One example of implementing a multiple independent single-processor system configuration is shown in FIG. 5. One example of implementing a single multiple-processor configuration is shown in FIG. 6.

In addition, as shown in operation 710, one or more boot operations are performed by the motherboard, utilizing the second configuration. For example, if the second configuration is a multiple independent single-processor system configuration, a first CPU mounted on the motherboard may retrieve and implement its own boot code from its own local UEFI/BIOS, and a second CPU mounted on the motherboard may retrieve and implement its own boot code from its own local UEFI/BIOS. In another example, if the second configuration is a single multiple-processor configuration, the first CPU mounted on the motherboard may retrieve its own boot code from its own local UEFI/BIOS, and the first CPU may then link with the second CPU mounted on the motherboard, where both CPUs boot in a paired configuration.

Furthermore, as shown in operation 712, the motherboard operates in the second configuration. One example of operating a motherboard in a multiple independent single-processor system configuration is shown in FIG. 5. One example of operating a motherboard in a single multiple-processor configuration is shown in FIG. 6.

In this way, a motherboard may be configured (e.g., during manufacture) to implement multiple different operating configurations.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be setup. In some instances, the provisioning can be done manually, a provisioning tool may be utilized to provision the resources, and/or deployment tools may be utilized to deploy the code once the infrastructure is provisioned.

Figure 8:
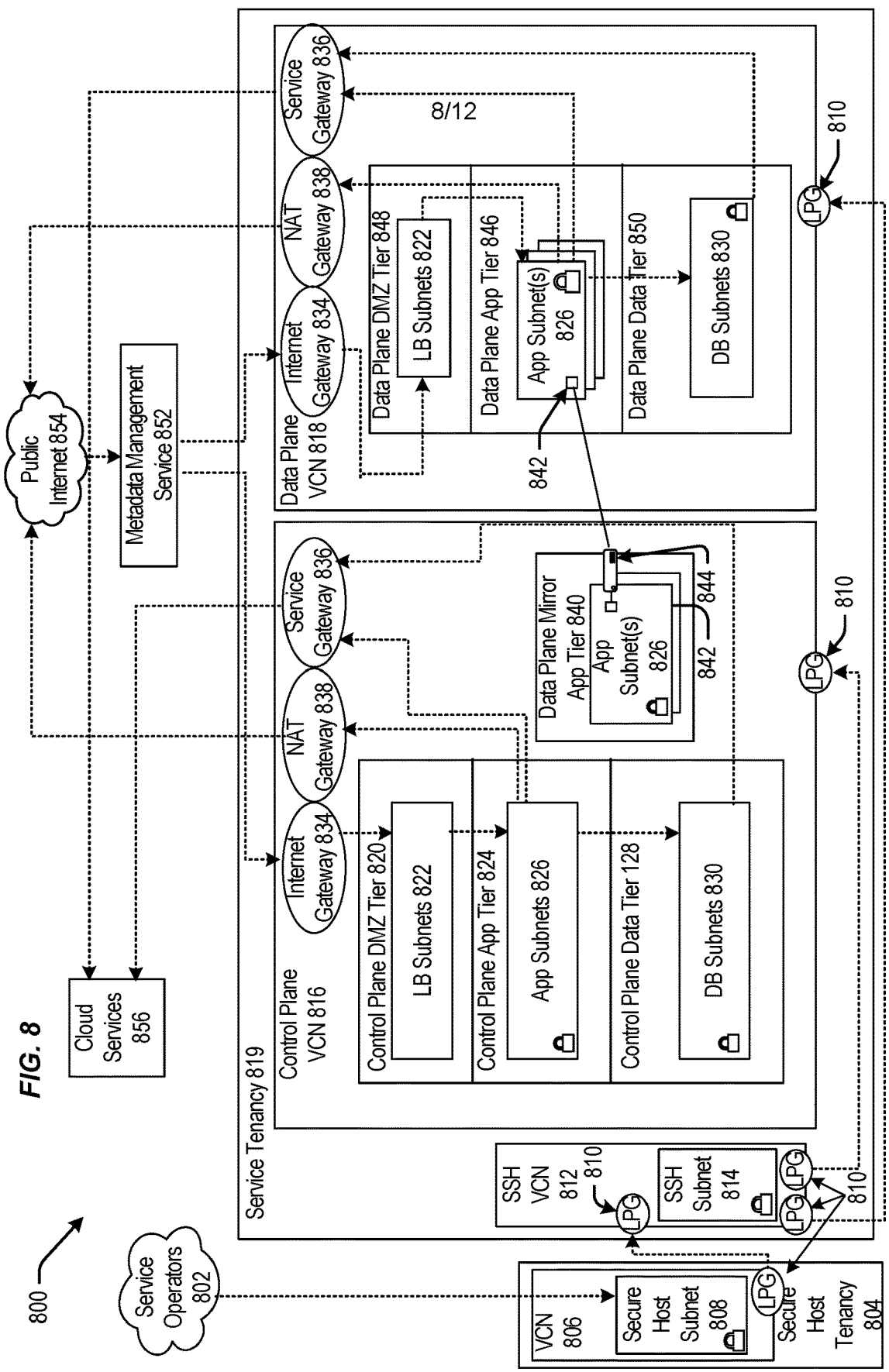
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
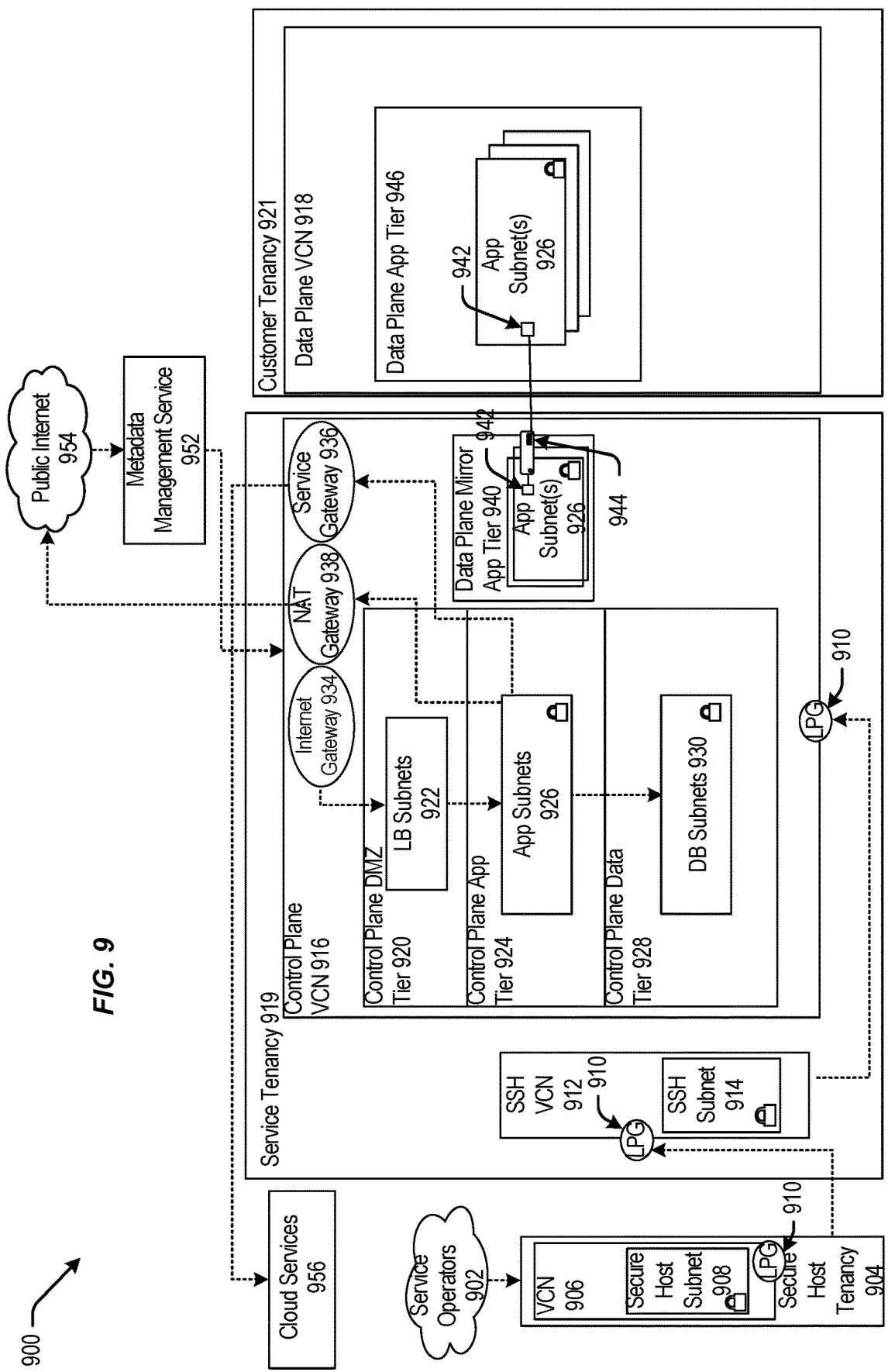
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
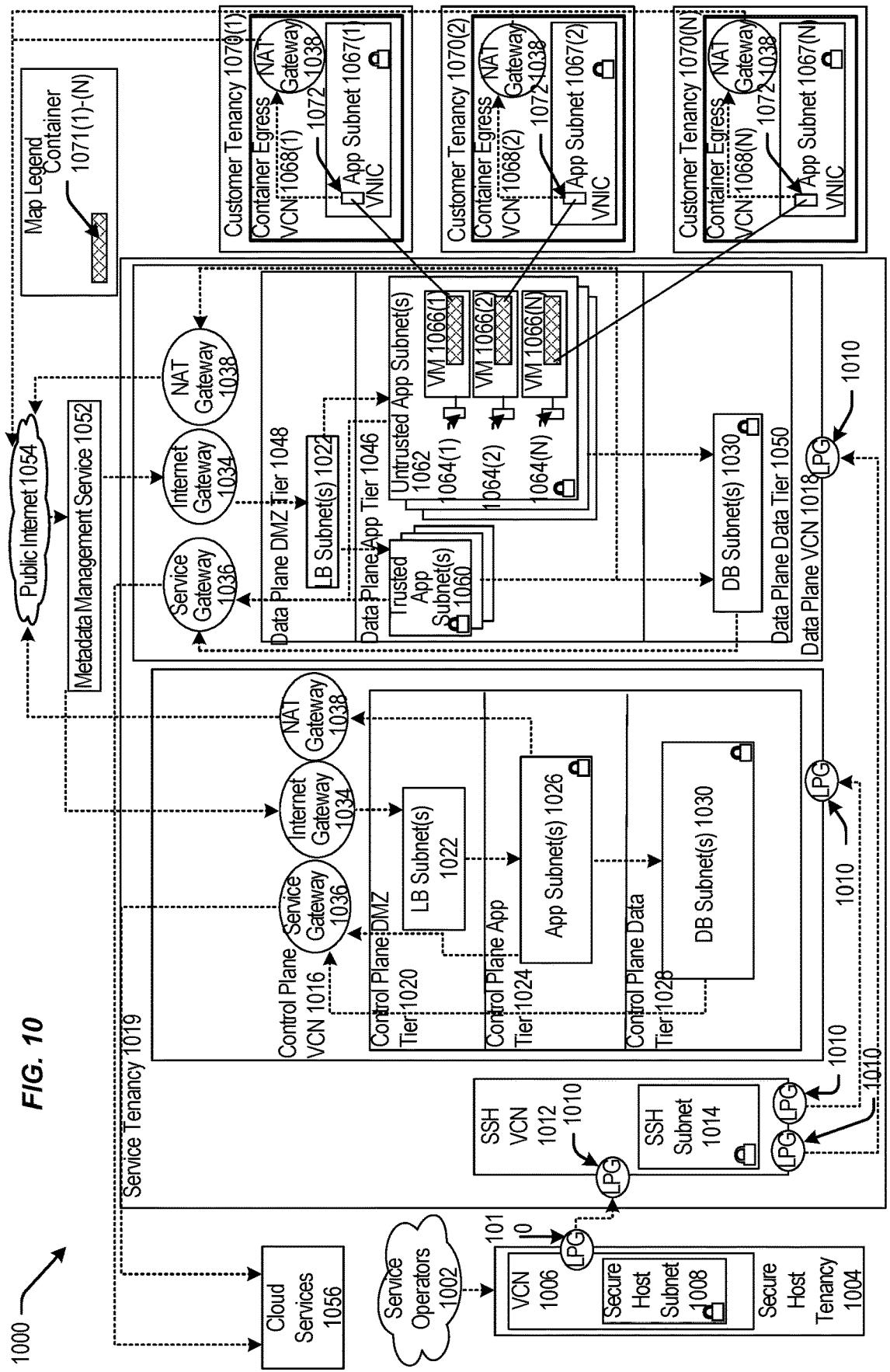
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
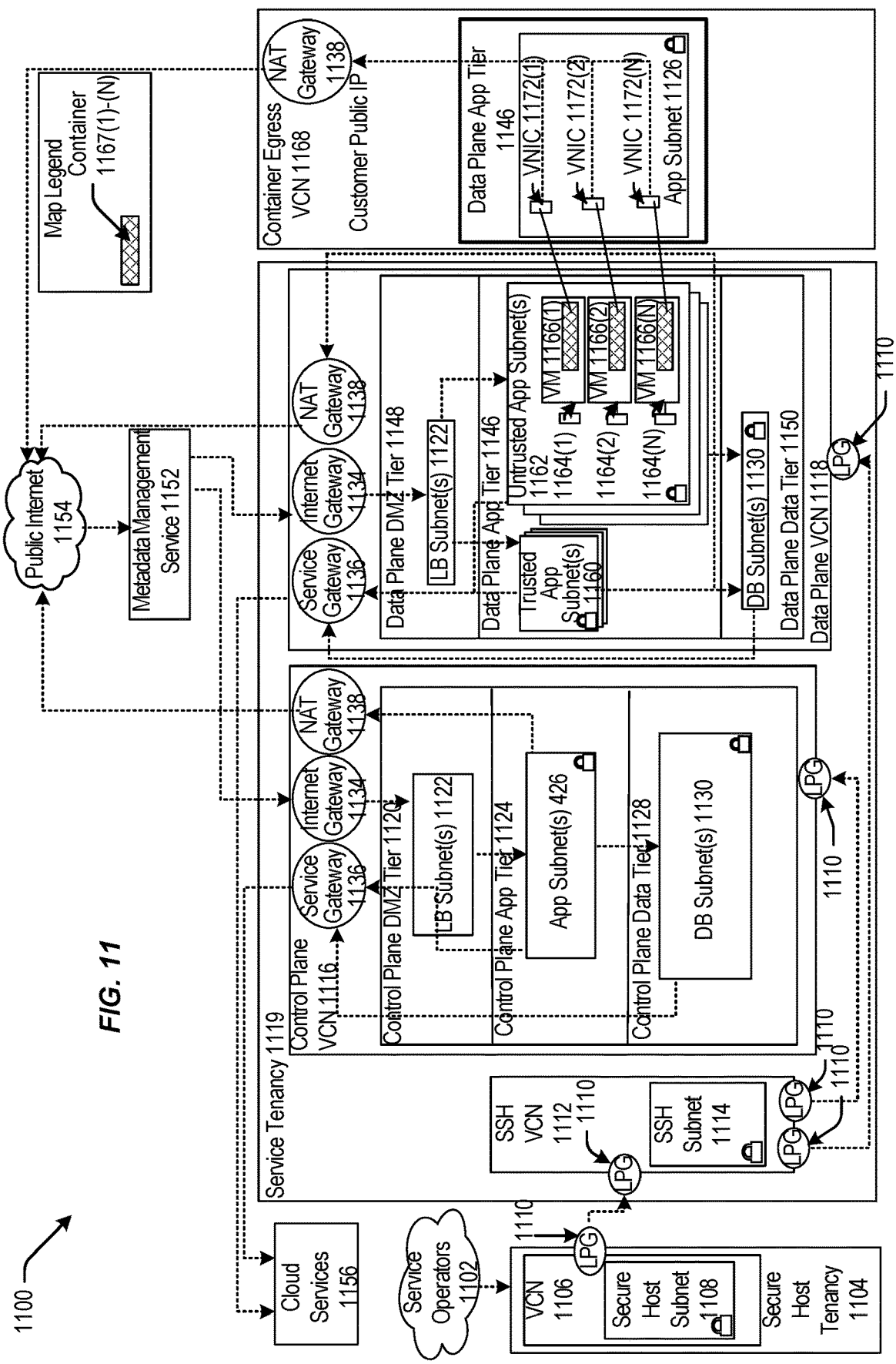
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
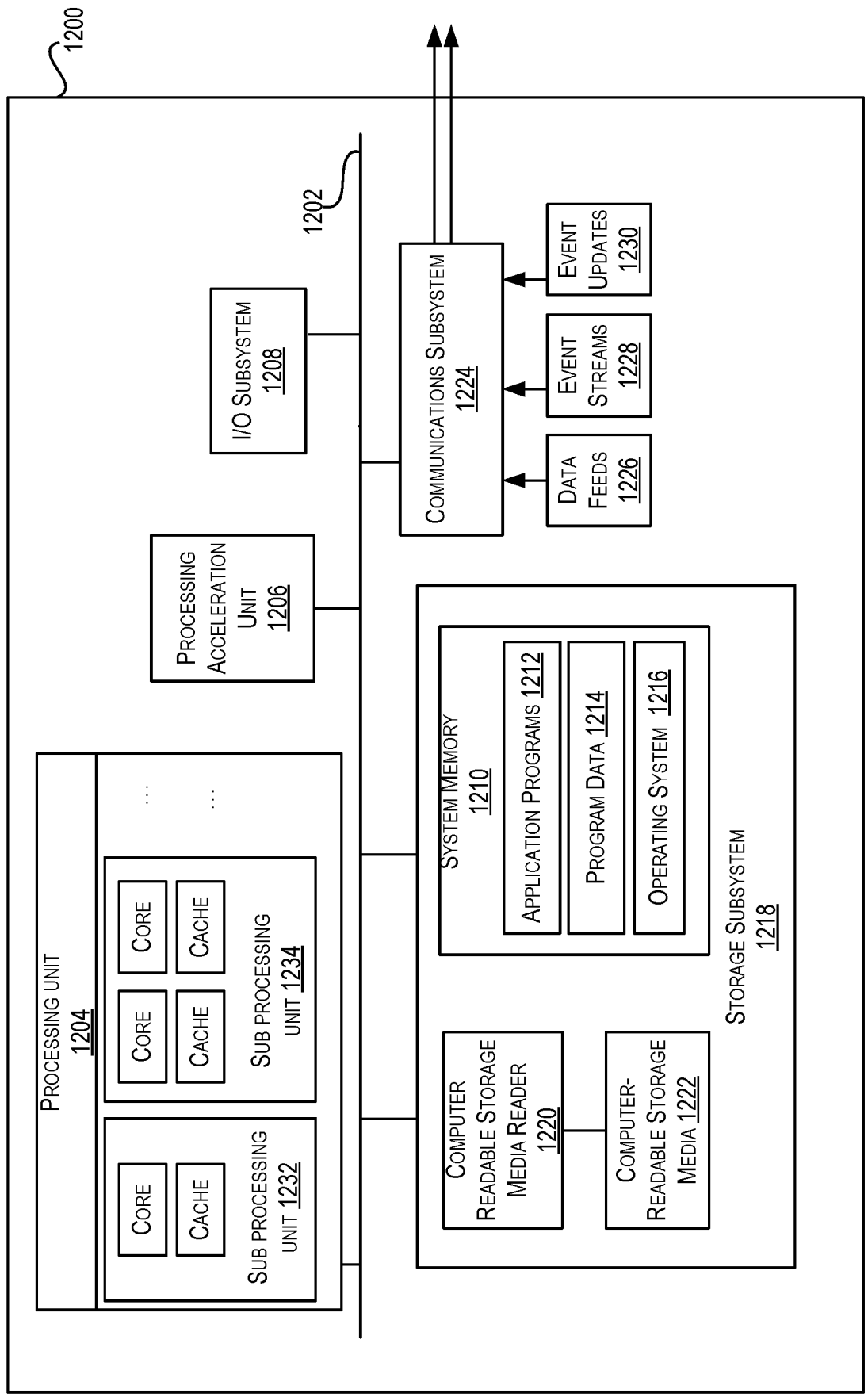
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Sirig navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, web cams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A motherboard hardware-implemented method, comprising:
responsive to a signal to configure the motherboard as multiple independent single-processor systems, configuring, by the motherboard hardware, one or more components within the motherboard to enable an operation of the motherboard as the multiple independent single-processor systems; and
responsive to a signal to configure the motherboard as a single multiple-processor system, configuring, by the motherboard hardware, one or more components within the motherboard to enable an operation of the motherboard as the single multiple-processor system.

2. The motherboard hardware-implemented method of claim 1, comprising:
receiving, by the motherboard hardware, the signal to configure the motherboard as multiple independent single-processor systems;
sending a multiple independent single-processor system configuration from a management block of the motherboard to a first control block of the motherboard;
implementing, by the first control block of the motherboard, a second control block of the motherboard, where the first control block manages a first processor of a first single-processor system and the second control block manages a second processor of a second single-processor system implemented within the motherboard;
configuring, by the first control block and the second control block of the motherboard, the corresponding first and second processors to boot independently of each other;
configuring, by the management block of the motherboard, resources of the motherboard so that both the first single-processor system and the second single-processor system have their own set of resources;
initializing, by the motherboard hardware, the first single-processor system with the first processor; and
initializing, by the motherboard hardware, the second single-processor system with the second processor.

3. The motherboard hardware-implemented method of claim 1, comprising:
receiving, by the motherboard hardware, the signal to configure the motherboard as a single multiple-processor system;
sending a single multiple-processor system configuration from a management block of the motherboard to a first control block of the motherboard;
configuring, by the first control block of the motherboard, both a first processor and a second processor to boot in a connected state;
configuring, by the management block of the motherboard, resources of the motherboard so that the single multiple-processor system has all available motherboard resources; and
initializing, by the motherboard hardware, the single multiple-processor system.

4. The motherboard hardware-implemented method of claim 1, comprising:
implementing, by the motherboard hardware, a first configuration of the motherboard;
receiving, by the motherboard hardware, a signal to change the first configuration of the motherboard;
placing, by the motherboard hardware, the motherboard into a standby mode;
receiving, by the motherboard hardware while the motherboard is in the standby mode, a signal indicating a second configuration different from the first configuration;
implementing, by the motherboard hardware while the motherboard is in the standby mode, the second configuration; and
performing, by the motherboard hardware, one or more boot operations utilizing the second configuration.

5. The motherboard hardware-implemented method of claim 1, wherein the signal is received at a management block of the motherboard.

6. The motherboard hardware-implemented method of claim 1, wherein configuring by the motherboard hardware, one or more components within the motherboard to enable an operation of the motherboard as the multiple independent single-processor systems includes implementing, by a first control block of the motherboard, a second control block of the motherboard, where the first control block and the second control block each comprise a field-programmable gate arrays (FPGAs).

7. The motherboard hardware-implemented method of claim 1, comprising sending a desired configuration from a management block of the motherboard to a control block of the motherboard, utilizing a serial peripheral interface (SPI).

8. The motherboard hardware-implemented method of claim 1, wherein configuring by the motherboard hardware, one or more components within the motherboard to enable an operation of the motherboard as the multiple independent single-processor systems includes configuring a first processor mounted to the motherboard to boot independently of a second processor mounted to the motherboard.

9. The motherboard hardware-implemented method of claim 1, wherein configuring by the motherboard hardware, one or more components within the motherboard to enable an operation of the motherboard as the single multiple-processor system includes configuring both a first processor mounted to the motherboard and a second processor mounted to the motherboard to boot in a connected state.

10. The motherboard hardware-implemented method of claim 1, wherein configuring by the motherboard hardware, one or more components within the motherboard to enable an operation of the motherboard as the multiple independent single-processor systems includes adding a processor parameter to communications between a management block and a control block of the motherboard, the processor parameter indicating a processor to which an associated operation is to be performed.

11. A motherboard comprising:
hardware configured to:
responsive to a signal to configure the motherboard as multiple independent single-processor systems, configure one or more components within the motherboard to enable an operation of the motherboard as the multiple independent single-processor systems; and
responsive to a signal to configure the motherboard as a single multiple-processor system, configure one or more components within the motherboard to enable an operation of the motherboard as the single multiple-processor system.

12. The motherboard of claim 11, wherein the hardware is further configured to:

receive the signal to configure the motherboard as multiple independent single-processor systems;
send a multiple independent single-processor system configuration from a management block of the motherboard to a first control block of the motherboard;
implement, by the first control block of the motherboard, a second control block of the motherboard, where the first control block manages a first processor of a first single-processor system and the second control block manages a second processor of a second single-processor system implemented within the motherboard;
configure, by the first control block and the second control block of the motherboard, the corresponding first and second processors to boot independently of each other;
configure, by the management block of the motherboard, resources of the motherboard so that both the first single-processor system and the second single-processor system have their own set of resources;
initialize the first single-processor system with the first processor; and
initialize the second single-processor system with the second processor.

13. The motherboard of claim 11, wherein the hardware is further configured to:
receive the signal to configure the motherboard as a single multiple-processor system;
send a single multiple-processor system configuration from a management block of the motherboard to a first control block of the motherboard;
configure, by the first control block of the motherboard, both a first processor and a second processor to boot in a connected state;
configure, by the management block of the motherboard, resources of the motherboard so that the single multiple-processor system has all available motherboard resources; and
initialize the single multiple-processor system.

14. The motherboard of claim 11, wherein the hardware is further configured to:
implement a first configuration of the motherboard;
receive a signal to change the first configuration of the motherboard;
place the motherboard into a standby mode;
receive, while the motherboard is in the standby mode, a signal indicating a second configuration different from the first configuration;
implement, while the motherboard is in the standby mode, the second configuration; and
perform one or more boot operations utilizing the second configuration.

15. The motherboard of claim 11, wherein the signal is received at a management block of the motherboard.

16. The motherboard of claim 11, wherein configuring, by the motherboard hardware, one or more components within the motherboard to enable an operation of the motherboard as the multiple independent single-processor systems includes implementing, by a first control block of the motherboard, a second control block of the motherboard, where the first control block and the second control block each comprise a field-programmable gate arrays (FPGAs).

17. The motherboard of claim 11, wherein the hardware is further configured to send a desired configuration from a management block of the motherboard to a control block of the motherboard, utilizing a serial peripheral interface (SPI).

18. The motherboard of claim 11, wherein configuring, by the motherboard hardware, one or more components within the motherboard to enable an operation of the motherboard as the multiple independent single-processor systems includes configuring a first processor mounted to the motherboard to boot independently of a second processor mounted to the motherboard.

19. The motherboard of claim 11, wherein configuring, by the motherboard hardware, one or more components within the motherboard to enable an operation of the motherboard as the single multiple-processor system includes configuring both a first processor mounted to the motherboard and a second processor mounted to the motherboard to boot in a connected state.

20. Motherboard hardware storing a set of instructions, the set of instructions when executed by the motherboard hardware causing processing to be performed comprising:
responsive to a signal to configure the motherboard as multiple independent single-processor systems, configuring, by the motherboard hardware, one or more components within the motherboard to enable an operation of the motherboard as the multiple independent single-processor systems; and
responsive to a signal to configure the motherboard as a single multiple-processor system, configuring, by the motherboard hardware, one or more components within the motherboard to enable an operation of the motherboard as the single multiple-processor system.

* * * * *